Figure 1:
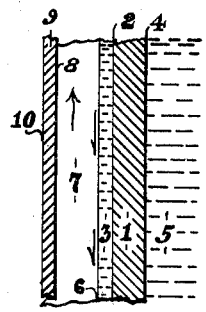

March 18, 1941.     E. A. RICHARDSON     2,235,644
PROCESS AND APPARATUS FOR EFFECTING CHEMICAL REACTIONS
INVOLVING A MELT AND A GASLIKE BODY
Filed March 9, 1937     2 Sheets-Sheet 1

Edward Adams Richardson     INVENTOR.

BY Besser & Harding
ATTORNEYS.

Patented Mar. 18, 1941

2,235,644

UNITED STATES PATENT OFFICE 2,235,644

PROCESS AND APPARATUS FOR EFFECTING CHEMICAL REACTIONS INVOLVING A MELT AND A GASLIKE BODY

Edward Adams Richardson, Bethlehem, Pa.

Application March 9, 1937, Serial No. 129,914

11 Claims. (Cl. 23—81)

This invention relates more particularly to such chemical reactions as may occur between a reactant-containing melt body and a reactant-containing gaslike body.

This invention consists essentially in causing a reactant-containing melt body to flow in a film over the surface of a solid body capable of transferring heat between the film and a suitable heat reservoir, while causing a reactant-containing gaslike body to flow in contact with the melt film, preferably in turbulent flow and preferably in a thin layer. This invention also includes the provision of apparatus adapted to carrying out such a process under a wide range of conditions.

Before proceeding to enumerate the objects of this invention, it should be noted that definitions of such terms as "melt," "gaslike body," "heat-permeable wall," "heat reservoir" and the like are given in the section of this patent application containing the detailed description of the invention. These terms are used with special significance for the purposes of this application.

In certain processes, such, for example, as the alkali-cyanide process for the fixation of nitrogen, a mass of solids has been used, frequently in briquetted form, the mass being heated in a retort or kiln and subjected to the action of a nitrogen-containing gas. Certain of the solids melt at the temperature of the reaction, tending to produce a pasty mass. Great difficulty has been experienced in securing uniform and effective gas and heat penetration into the mass, resulting in slow reaction and incomplete reaction and loss of reacting materials by overheating.

Objects of my invention relating to processes, methods and apparatus for facilitating chemical reactions through utilization of a system comprising a melt body and a gaslike body in contact therewith are as follows:

A. To handle heat interchanges controllably, particularly in large quantities, so that conditions favorable to the reaction may be established and maintained;

B. To provide a large and uniform contact area whereby uniform contact may be secured and maintained;

C. To speed up the reaction, whereby compact and inexpensive apparatus may be utilized;

D. To handle reactions over wide ranges of temperatures and pressures whereby a large number of reactions may be adapted to my invention, securing for them the advantages of a reaction between a liquid and a gas;

E. To provide for the utilization of catalysts, particularly when such catalysts must not appreciably contaminate the product;

F. To provide for flexible but continuous operation;

G. To supply the melt and gaslike bodies to the reaction and remove the products therefrom at a high rate;

H. To conserve process heat and utilize by-product energy efficiently, utilizing "New and useful methods of insulating vessels and structures of great variety," my copending patent application Serial No. 7,582, filed February 20, 1935;

I. To secure the benefits of a reaction of this type when a solid substance enters into the reaction;

J. To increase the precision with which chemical reactions of the sort described may be carried on and controlled;

K. To improve the alkali-cyanide process of nitrogen fixation and make it commercially practicable and adaptable to the rapid increase in the production of nitrogen salts and products for the country in times of emergency with the greatest economy in man-power;

L. To adapt the discovery of P. A. Starke, United States Patent No. 1,256,273, to a reaction of this type and carry it out in a practicable manner.

Other objects may appear.

Certain advantages may be mentioned.

In the alkali-cyanide process, which depends for success on a continuous process capable of high rates of heat transfer and high rates of reaction, we can utilize over 90% of the heat derivable from the process, secure the proper sequence of steps and accurate temperature control within the limited temperature range of each step, and secure 98 to 99% conversion and obtain a crude cyanide of unusually high purity direct from the process while obtaining 4 to 12 tons of N₂ fixed per square foot of film area per year. Troublesome pasty masses are avoided and the penetration of heat and interpenetration of reactants enormously increased. The limits for satisfactory cyanide formation lie well within a narrow temperature range of about 900° to about 1050° C. With my apparatus and methods every part of the material can be transformed within this range.

In the alkali-cyanide process, the crude may contain 1 to 2% unchanged carbonate, the neutral salt utilized for lowering melt temperature of melting, very small quantities of free carbon and ash, very small amounts of alkali metal and oxide thereof, and substantial freedom from iron, permitting use of the crude cyanide for many commercial purposes without further treatment. Such crude is particularly suitable for hydrolyzation for ammonia, or treatment with $CO_2$ to recover HCN.

Another advantage lies in the application of my apparatus and methods to a new process of fixing nitrogen direct as ammonia according to the P. A. Starke discovery that under temperatures below those for cyanide formation, an alkali-cyanide catalyst without carbon when traversed by a mixture of hydrocarbon gas and nitrogen under pressure yields ammonia. As an example of the method of adapting the Starke discovery, I produce a melt-body comprising an alkaline substance such as sodium carbonate and common salt or potassium carbonate or other material neutral to or entering into the reaction with a melting point about 600 degrees centigrade, flow the melt over a fixed catalyst screen of an iron group metal, and flow over the film surface of the melt a mixture of hydrocarbon gas and nitrogen, maintaining the pressure and temperature within the limits specified by Starke but preferably above the melting point of the melt and at a pressure of the order of 200 atmospheres. The ammonia is driven off and recovered, while the melt with its content of finely divided carbon is withdrawn and returned to the reaction either with or without freeing of finely divided carbon. Or the carbon-containing molten material may be subjected to a cyanide forming operation to recover the contained carbon, the cyanide driven off, and the recovered salts returned to the Starke type of process. Such a combined process is preferred, since ash-free carbon is obtained from the gases. If desired, pulverized solids may be introduced in the gaslike body to assist the reaction. In this connection, my high-pressure methods described in my application Serial No. 7,582, are applicable and high heat economy may be secured.

My invention offers special advantages, where the process can be adapted to it, in catalytic processes involving large absorption or evolution of heat, for temperature control is frequently of great importance to satisfactory operation, and ability to control temperature while handling large quantities of heat is a distinguishing feature of my invention.

Other advantages will appear as I proceed with the specifications.

The drawings will serve to illustrate the nature of my invention and the manner in which it may be adapted to a given process or set of conditions, together with other important considerations.

Figure 4:
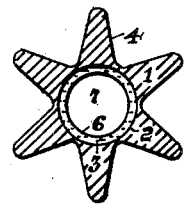
Figure 3:
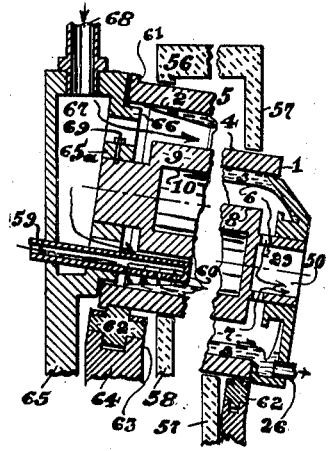
Figure 5:
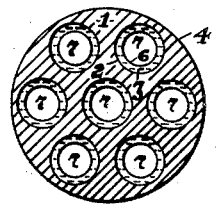
Figure 2:
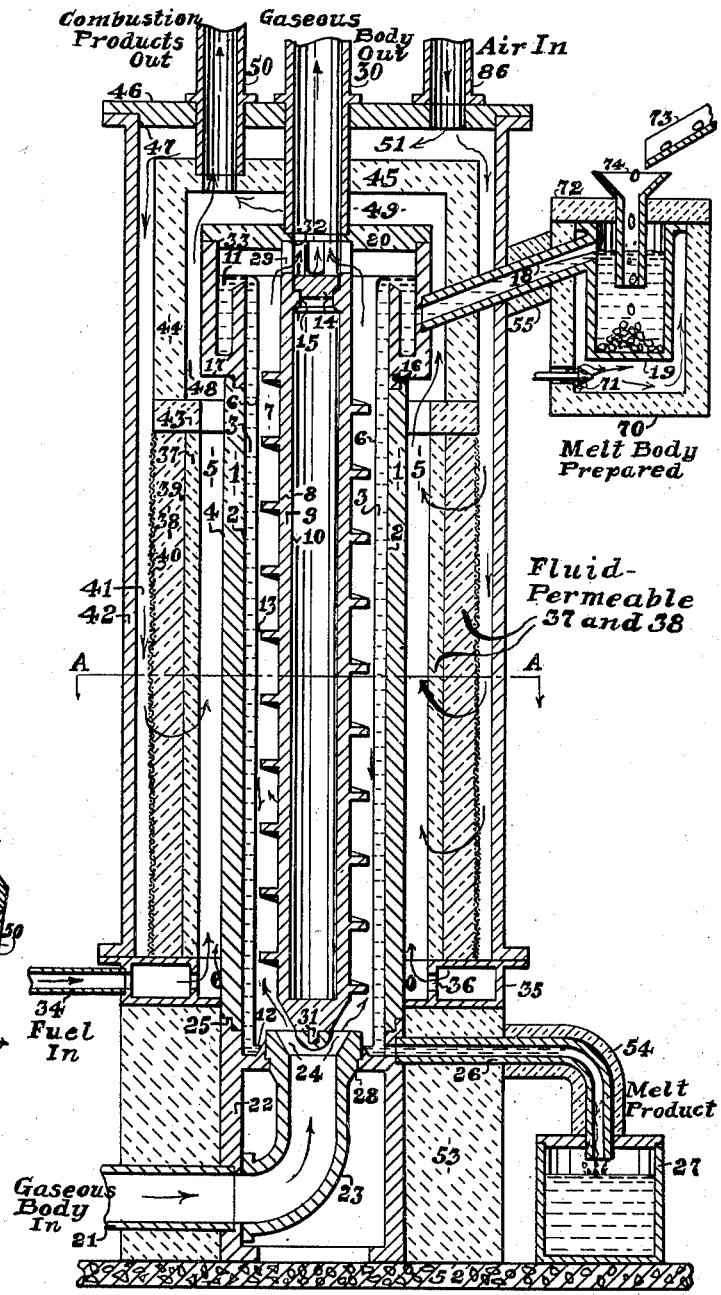
Figures 6, 7:
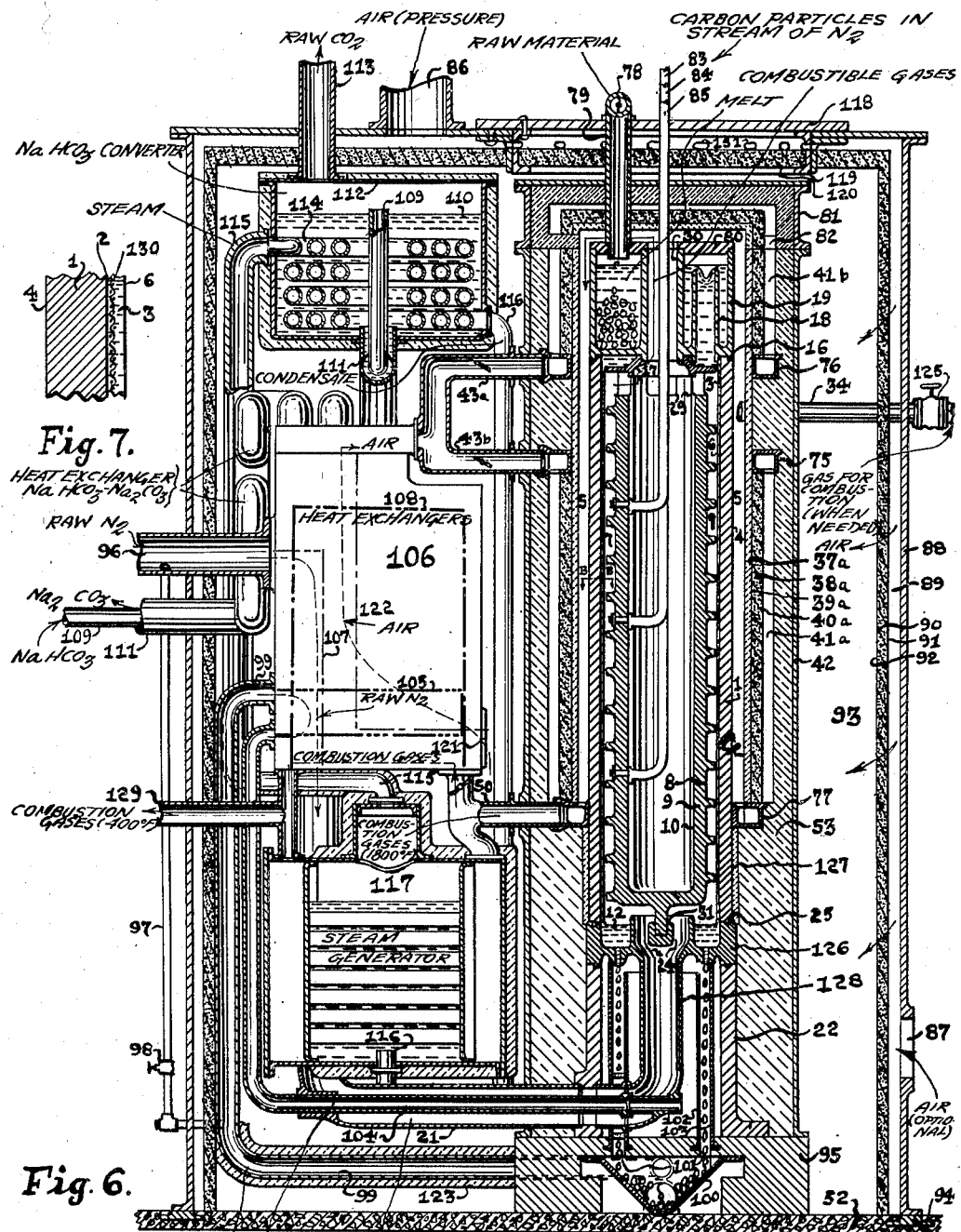

Figure 1 illustrates in cross-section the essential element of the invention. Figure 2 shows in cross-section a simple form of apparatus involving my invention, together with certain auxiliary apparatus. Figures 5 and 4 illustrate diagrammatically in cross-section variations in the "wall" member, which cross-sections, though not the section on A—A of Figure 2, are taken in the same relative position. Figure 3 illustrates in cross-section a rotary kiln type modification of my invention. Figure 6 illustrates in cross-section, substantially, a more complicated embodiment of my invention in an apparatus particularly suited to carrying out the alkali-cyanide process. Figure 7 is an enlarged cross-sectional view of a wall element of Figure 6 as at B—B.

Before proceeding further, certain terms will be defined in order to facilitate securing an understanding of the invention and the scope thereof.

*"Heat-permeable wall."*—Any structure possessing a film surface and a heat reservoir surface (2 and 4, respectively) which, coacting with the heat reservoir 5, is able to secure an acceptable combination of heat conveying ability and temperature drop. The actual structure, whether solid, built-up, or more complicated, is of minor importance. The material, or materials, provided the conditions imposed are met, is of minor importance. In some cases a material normally regarded as heat-insulating may suffice. Apparatus may be built into the wall for other purposes without affecting the function for our purpose. Sometimes a thin solid metal wall may scarcely suffice to meet the requirements; sometimes a light metal webbing may be sufficient to connect surfaces 2 and 4 to meet the heat flow and temperature drop requirements. Of course those skilled in the art who may desire to practice this invention must use their skill to choose materials, structures, and the like which will secure the desired compromise with such conditions as heat flow requirements, corrosion, chemical effect on the film, strength, and many others.

*"Heat reservoir."*—In thermodynamics a heat reservoir is an imaginary device possessing a finite assigned temperature and an infinite capacity for heat, whether absorbing it or yielding it up. Under equilibrium conditions, any heat absorbing or heat developing means which is able to maintain a constant temperature at a desired rate of heat flow qualifies under my definition, though it may depart from the ideal under varying conditions of heat flow. It is sufficient if the ideal is satisfactorily approximated in any assigned case.

Heating means which may serve as a "heat reservoir" include, for example, a flowing water jacket, a water jacket evaporating under fixed pressure, a steam jacket, a jacket of hot gases, a furnace of burning gases, an inclosure of a heat radiating material, some other form of controlled exothermic chemical reaction, heat developed by an electrical resistance, heat induced by electrical induction, and probably others. To qualify as a reservoir, the flowing water, for example, must have its rate of flow controllable and the rate of flow must be such as will maintain the desired temperatures within allowable limits. Where a temperature sequence is desired, the proper direction of flow, either with a single jacket or a plurality of jackets, the latter individually controlled, may serve to approximate the ideal in an acceptable manner. The rate of flow will depend upon the temperature drop permitted between entrance and exit of the jacket and the amount of heat to be supplied, together with the rate at which heat can pass through the fluid film and the wall under conditions of flow and the exposed wall area. By due attention to these features by one skilled in the art, heat may be supplied in a manner satisfying the definition.

Similarly, heat absorbing means may include a flowing water jacket, liquids evaporating under fixed pressure, melting solids, an endothermic chemical reaction, a radiation-absorbing and heat-removing enclosure, a current of air, and perhaps others. Similar considerations must be regarded by those skilled in the art in adapting such means to serving as heat reservoirs for absorbing heat. In any case, these heat yielding and heat absorbing means must coact with the wall 4 to simulate a heat reservoir, excepting, possibly, in the case of a metal wall heated by electrical induction, and perhaps others.

"*Melt.*"—A characteristically liquid body. It may be a simple normally solid compound reduced to a liquid by heating. It may be a mixture of normally solid compounds reduced to a liquid by heating. It is necessary to exclude such mixtures as melt without a temperature rise (though with the absorption of heat) such, for example, as common salt and ice at or below 32° F. One component of the mixture may be a liquid in certain special cases. However, it is not intended to include solutions formable at normal temperatures, nor cases in which the liquid is present in large quantities. A hypothetical example of a liquid occurring in a melt might be that of liquid mercury added to a metal of low melting point. Heat in general is to be used in producing a melt and the temperature of the melt will be above normal temperature. Heat may be added, also, for the express purpose of increasing the fluidity of the melt. A melt may contain a certain amount of gas in solution. A melt may be used to dissolve small quantities of a reacting solid which cannot be incorporated into the melt in large amounts. It is not absolutely essential that the melt, prior to entering the zone of reaction, shall necessarily be "reactant-containing" though this will usually be the case.

It is not necessary that the components of the melt shall all be reactants. Some components may be added to secure a mixture of lower melting point, some for other purposes which will be suggested further on in considering films and catalysts. Some components may have no relation whatever to the steps of the process with which my invention is concerned. In general the melt is very generally a liquid body which at least sometime during the process serves as a theater for the reactant, and such a body is not a water solution at normal temperatures. A melt may carry a finely divided solid in suspension. It can flow and form a film.

"*Gaslike body.*"—A gaslike body may be a simple gas, a simple vapor, or a simple gasified liquid (above the critical temperature). It may consist of a mixture of one or more of the preceding. It is not essential that this mixture shall contain a reactant, though it is to be expected, in general, that such will be the case. A pulverized solid may be introduced into the gaseous mixture and conveyed therein to the zone of reaction. The pulverized solid-in-gas mixture partakes of some of the characteristics of a gas and will be considered as a gaslike body. It is even possible to have a pulverized (or atomized) liquid in suspension as a component of the gaslike body.

In some cases the gaseous part of the body will merely serve to carry the suspended pulverulent material.

"*Reactant.*"—Though normally this term means a substance entering into a chemical reaction other than a product or catalyst, this term will be more generally used, herein, to denote either initial or final substance, or any intermediary chemically taking part in the process. The justification for this resides in the fact that all chemical reactions are more or less reversible so that the "forward" action is accompanied by some "backward" reaction.

"*Chemical reaction.*"—It has always been difficult to distinguish between chemical and physical processes, particularly in dealing with the nature of solutions, and similar boundary line cases. There is an imperceptible gradation from largely physical to largely chemical. Certainly it is not my intention to evaporate a film of liquid with heat and pass a current of gas over it. Nor is it my intention to cover anything which is old which comes in this debatable region.

Of course, when definite chemical compounds occur, there can be no question. In cases of doubt, the question should be considered on its merits.

"*Hydraulic radius.*"—This term is used in its usual sense and may be defined as the area of the cross-section of a stream divided by the wetted perimeter of such section.

Returning to the drawings again, having indicated the significance of certain terms much used in the specifications and claims of this patent application—

In Figure 1 is shown a heat-permeable wall-element 1, and coacting therewith through surface 4 a heat reservoir 5 of such temperature and heat capacity as may serve to secure or maintain an assigned temperature in reactant-containing melt film-element 3 flowing over wall surface 2, together with surface 8 of wall-like elements 9 coacting with surface 6 of film 3 to guide a reactant-containing gaslike body 7 over and in contact with surface 6 of film 3, whereby a chemical reaction between the reactants may be secured. The significance of surface 10, though shown, will appear later.

With regard to the process involved in Figure 1, it consists in flowing a melt film 3 over a surface, supplying or removing heat, to maintain the temperature of the film, through said surface, while guiding a gaslike body over and in contact with said film 3, whereby a chemical reaction is produced.

Figure 2 shows a simple form of apparatus, involving my invention, in vertical cross-section. 1 is a vertical tubular wall, preferably of metal, over whose inner surface 2 a film of melt 3 descends by gravity from feeding pool 11 in casting 17 to gathering pool 12, in base casting 22, from which the melt is discharged through pipe 26 into receiver 27. Pool 11 is supplied through pipe 18 from melting pot 19 by overflow therefrom. The gaslike body is supplied through pipe 21, base casting 22, fitting 23 and passages 24 to space 7 and from there through ports 29 in wall 9 and pipe 50 to the atmosphere or other apparatus. Passage 7 is formed by the coaction of surface 6 of film 3 and surface 8 of wall 9, which surface is shown formed into a helical passage, the thread-like wall of which has a small clearance relative to film 3 as at 13. Wall 9 forms a hollow member through surface 10, which hollow is shown closed at the lower end by casting, and at the upper end by a refractory ring 14 supported on rib 15.

Upper pool casting 17 is shown closed by a cover 20 rabbeted to 17 at 33. Tubular wall 1 is shown rabbeted at 25 to base casting 22. Fitting 23 is shown rabbeted in place in base casting 22 at 28, and should have a suitable gastight fit where pipe 21 enters. Base casting 22 is shown resting on floor 52. Base casting 22 is shown insulated with heat-insulating material 53, pipe 26 is insulated with heat insulation 54, and pipe 18 is insulated with heat insulation 55. Melting pot 19 is shown set in a furnace of refractory material 70 surrounded on the sides and bottom by combustion space, 71 being the burner feeding in fuel. The pot and furnace are covered by refractory cover 72 provided with a funnel 74 for guiding crushed material to be melted, which falls at a regulated rate from spout 73, into the pot 19.

The heat reservoir, which involves a vertical retort furnace as disclosed in my copending patent application entitled "Furnaces of great variety," Serial Number 47,355 of 1935, consists of a combustion space 5, formed between surface 4 of wall 1 and a porous or perforated refractory wall 37, fed by gas box 35 through holes 36, the gas box being fed through pipe 34. Air for combustion is fed through pipe 86 to space 51 between refractory heat insulating roof 45 and the metal cover 46 shown rabbeted to metal casing 42. Picking up heat from the roof, the air passes between casing 42 and refractory heat insulating wall 44 and the refractory ring carrying wall 44 into space 41 between the metal casing and "boundary layer subdividing material" 38 which granular material is shown quilted between wire netting or gauze 40 and wire netting or gauze 39. The somewhat heated air passes radially inwards through quilt 38, picking up heat and becoming preheated, passes through wall 37, and burns with the combustible-containing gases in space 5 to liberate heat at a fairly uniform rate throughout the length of wall 1.

The products of combustion leave space 5, passing between refractory ring 43 and wall 1 and casting 17, into space 48 formed between casting 17, cover 20, and refractory wall 44 into space 49 between cover 20 and refractory roof 45, from which space they are discharged into pipe 30.

It should be noted that wall member 9 is supported by fitting 23 and positioned therein by a step joint 31. Wall member 9 is position fixed by recess 32 in cover 20, whereby a uniform clearance 13 may be maintained and yet longitudinal expansion permitted.

Receptacle 27 is shown provided with a cover. No means for emptying or replacing are shown, but one skilled in the art may adapt such arrangements to the process. No control valves are shown, but they may be provided by one skilled in the art to adapt the apparatus to the requirements of the process. For example, the rate of gaslike body supply might be regulated by a fan in pipe 21, the rate of combustible gas supply might be regulated by the pressure in pipe 34 and valve control, the admission of air through pipe 86 might be automatically regulated by a throttling valve to maintain an assigned carbon dioxide percentage in the gases leaving through pipe 30 while pipes 30 and 50 might be open to the atmosphere.

Operation may be commenced by igniting gas at holes 36 as the gas supply is turned on in 34, adjusting the rate of gas and air supply to heat up at such rate as may be found easy on the apparatus. Meanwhile melting may commence, to have a full pot ready. When everything is ready, and the film has formed on 2 and melt appears at 12, gas may be admitted through 21 and gas supply 34 adjusted for operation. Rejecting the first melt coming down, we may proceed with the reaction.

Obviously suitable lighting holes in 35, observation holes in 22, temperature reading instruments, and feed regulating means for supplying the solid melt material may be easily provided as required.

In shutting down, melting is stopped, heating to temperature is maintained by shutting down partly on gas supply 34 and gas supply 21 until the wall is substantially clear of film, whereupon complete shut-down may be effected.

Preferably, the process will be carried out in such a manner, as hereinafter described in more detail, that the thickness of the annular melt film on any plane at right angles to the direction of flow thereof will be constant and the velocity of flow of the melt film across any such plane will likewise be constant and the same at every point in the plane. Also, the thickness of the gaslike body should be constant on any such plane and its velocity or mass rate of flow across such plane should be uniform and constant.

It is also desirable that the heat transmission between the melt film and the fluid heat exchange medium be controlled by varying the temperature and rate of flow of such fluid between different zones, measured coursewise of the melt film, so as to maintain uniform temperatures in the melt film throughout such zones.

Figure 3 shows a tubular rotating kiln 1 upon whose surface 2 a melt film is maintained by capillarity and perhaps by centrifugal force while slowly flowing downwards. The melt is fed from any suitable source to 2 through spreading pipe 59 shown with feeding holes 60. Kiln 1 is shown flanged at 61 to permit of roller support 62 in pedestal bearing 64 provided with journals 63 to take the thrust. The kiln passes through furnace space 5 forming a heat reservoir coacting with surface 4, the furnace being formed by end walls 57 and 58, pierced to receive the kiln, and roof 56, all of refractory material. Reactant-containing gas is fed through pipe 68 into feeding space 67 of gas chest casting 65, flanged at 66 to fit kiln 1 closely, the gases passing through space 7 to the discharge. Space 7 is formed between film surface 6 and hollow wall casting surface 8, casting 9 being shown with an extension carried in an extension bracket 68 in chest 65, the casting being prevented from rotating by set-screw or bolt 69. This drawing is shown primarily to indicate the diverse forms which my invention may assume. Operation will be obvious in view of the description of Figure 2. Of course the details of such a kiln form of structure and its actual mode of operation may be greatly modified. Wall 8 is shown without the helical path, a form of passage usable in certain cases.

Figure 4 shows in cross-section a possible form of a tubular wall 1 taken on a section corresponding to line A—A of Figure 2. By this view I merely wish to suggest that it may be necessary from the heat transfer standpoint to make surface 4 large compared with surface 2. Although longitudinal ribs are indicated, any other suitable means of extending surface 4, consistent with the other design features, may be used. In this drawing I have suggested that wall-like elements 9 of Figure 1 may be composed of facing parts of wall 2, forming thereby a tubular passage 7 for the reactant-containing gaslike body.

Figure 5 is a cross-section similar to that shown in Figure 4, but in this case it is desirable to have surface 2 large compared with surface 4. In this case, wall 1 is the mass left after perforating the cylindrical metal (or other) mass with tubular spaces 7 formed by walls 2. As in Figure 4, I suggest that passage 7 may be formed by facing wall or film surface elements. In an extreme form of such a construction, we might have walls 2 formed by thin tubes in thermal contact with a thin metal wall 4 through a heat conductive webbing or in some other manner. Such a construction would suggest relatively low requirements in the process for heat, whereas the form of Figure 4 suggests high requirements for heat. However, the exact type of construction will be determined by a number of factors, such as heat required, heat available, temperature drop permissible in 1, coefficient of heat transfer in film 2, and also in film 4, and the available temperature of the heat reservoir. Such a determination may be made by one skilled in the art to meet the requirements of my invention. The construction of Figure 5 may approach a filled tower construction, but loose contacts afford a poor heat path, wall 1 is no longer "heat permeable."

Figure 6 illustrates in cross-section (vertically) an arrangement of my invention with other auxiliary equipment in a manner particularly adapted to the economy of heat in one form of process for the manufacture of raw hydrocyanic acid gas by the alkali-cyanide process.

This process, as carried out in the apparatus to be described, may be briefly stated to comprise the passage of a molten film of an alkali salt in counterflow at the proper temperature with a stream of raw nitrogen, while there is supplied to the molten film in the reaction zone carbon in pulverulent form. The molten film, before it reaches reaction temperature, absorbs some carbon and volatilized materials from the counterflowing gas stream, and at the same time exchanges heat with the gas stream. In the reaction zone cyanide is formed with the absorption of carbon and nitrogen and the release of carbon monoxide, while in a subsequent zone the carbon, and cyanide-containing melt film as long as it is above red heat, reduce oxygen, carbon dioxide and water vapor impurities in the raw nitrogen to hydrogen and carbon monoxide. Here there is also heat exchange between the melt film and the gas stream whereby the film is cooled and the gas stream heated. In this manner the stream of entering raw nitrogen is converted in its passage to a combustible gas, which, as described, is burned to secure heat required in the process.

It is accordingly desirable to have sufficient carbon present to cause reduction of oxygen, oxides and water vapor in the raw nitrogen supply so that the molten cyanide will not be attacked by such materials. Likewise the nitrogen may be supplied in such excess as may be required, particularly for securing high alkali conversion to cyanide.

In Figure 6 the convertor, contained substantially in casing 42, together with the auxiliary equipment, is placed inside a heat insulated room whose wall is substantially casing 88, the insulation being installed according to my copending patent application Serial Number 7,582, while the vertical retort furnace and casing 42 involved in this apparatus is disclosed in my copending patent application, Serial Number 47,355 of 1935, both as previously noted. Floor 52 is shown uninsulated for convenience in drawing, but means for insulating the floor by my methods will be obvious to any one skilled in the art. Utilizing this method of heat insulation, the only heat which can leave the inclosure must pass through a support such as 95 which may be made small, the heat in the cooled products of combustion leaving at 129, the small amount of heat in the sodium carbonate wash solution leaving through 111, the heat in the carbon dioxide and water vapor leaving through 113, and the sensible heat in the cyanide-containing product leaving through 124. All other heat is utilized usefully or picked up in preheating the air for combustion which serves as an atmosphere for the chamber. The low temperature heat lost may obviously be recovered in large part by having various operations now taking place outside the casing 88 carried out within that casing.

As this drawing is in a measure diagrammatic, shell reinforcement, insulation supports and supports for equipment have been substantially eliminated from the drawings so as better to illustrate the invention. Valves, check valves, blowers, pumps, thermometers and other control instruments have been omitted. Those skilled in the various arts involved may readily provide the items of equipment required in any particular case to meet given conditions in view of my specification requirements.

Heat-permeable wall 1, preferably of nickel-chrome-iron alloy in the form of a long tube with thin wall, has melt film 3 flowing by gravity down surface 2 between the melt spreader casting 17 and melt pool 12 in casting 126, while surface 4 coacts with heat reservoir furnace space 5 to maintain temperatures in the various parts of the film within assigned limits. Surface 6 of film 3 coacts with surface 8 of wall 9 to guide the gaslike mass or body 7 over the melt film and counter-current thereto, said surface 8 having formed therein a helical passage, the thread-like wall of which has a small clearance relative to surface 6 of film 3. Wall 9 is formed into a hollow casting closed at the lower end, and provided with a support and centering pin coacting at 31 with a cross-piece in casting 128 to position fix this wall member 9, while the upper end is provided with ports 29 and is rabbeted to casting 17, coacting therewith to maintain the alinement of the upper end of said wall member 9. Wall 1 is rabbeted to casting 126 at 25 and is supported thereby, and is rabbeted to melting pot 19 at 16, thereby locating and supporting 19. Casting 126 is rabbeted to base casting 22 which is supported on foundation plate 95 carried by floor 52. Melting pot 19 is provided with central tubular passage whose wall is 30, and an overflow tube 18 by which melt may pass to the upper surface of 17 and thence to wall-surface 2. Pot 19 is provided with a close fitting cover 80, through which a conveyor pipe 79 fed by conveyor 78 passes and to which it is properly jointed. Base casting 22 encloses gaslike body admission pipe 128, shown as a part of casting 126 with passages 24 therethrough, which pipe through suitable fittings communicates through casting 22 with pipe 21.

Melt pool casting 126 is provided with perforations in the bottom through which the contents of melt pool 12 may drop into the annular space between partition 103, which extends between base 95 and casting 126, and partition 102, which extends upwards from casting 95 to close to casting 126, and through casting 95 into bin 100 through openings 101 in 95, the liquid drops being solidified and cooled during the fall. The granulated melt in bin 100 is removed by a conveyor into pipe 124 for suitable disposal.

The melt product passing out of the system at 124 may be used as such or may be treated, for example, after being finally cooled and pulverized, by being moistened with less than the theoretically required quantity of water and spread into a thin layer where it is subjected to the action of a warm body of very moist carbon dioxide gas in excess, which is rapidly passed through the layer with resultant absorption of water and carbon dioxide and the release of HCN. The alkali residue may be recovered, purified if desired, and returned as raw material to the process.

Now pipe 99 conveys cooled and purified nitrogen or other neutral gas into bin 100, from which some may pass through conveyor and pipe 124 while maintaining a neutral atmosphere therein, the main gas body, however, passing from 100 through passages 101 in casting 95 and through annular space between partitions 102 and 103 countercurrent to the cooling and solidifying melt, to the interior of partition 102 and into pipe 104 shown in heat exchange relation with raw nitrogen-containing gas pipe 21. The hot purified gases pass to heat interchanger 106 and through heating elements 105 suitably disposed therein to pipe 99 through which the cooled gases are returned to bin 100. If desired, pipe 99 may be insulated with insulation 123. Raw nitrogen gas may be bled into the purified gas system from raw gas pipe 96 through bleeder pipe 97 and control valve 98 into pipe 99 when the small amount of contamination of the product thereby resulting is within allowable limits. Otherwise, purified nitrogen in whole or in part must be bled.

The heat reservoir arrangements are an invention based on my copending patent application previously mentioned in which the heat insulation and air preheating means therein described form one wall of the furnace passage and serve to feed combustion air gradually into the burning gases whereby a substantially uniform rate of heat liberation may be maintained along the other wall of said furnace space. In this form of my alkali-cyanide invention I have shown the melting pot section of the apparatus provided with a section of preheated air supplying means independent of the section utilized for the maintaining of the reaction. Preheated air from heat interchanger 106 passes through branched pipe, whose branches 43a and 43b are separately valved for controlling the rate of air supply to the melting pot and the reaction heater sections, into melting pot air box 76 and reaction air box 75. The air from air box 75 passes into annular space 41a between heat insulation 53 and subdivided boundary layer 38a shown constructed of granular heat resisting material quilted between wire mesh or wire gauze layers 39a and 40a, through which the air passes fairly uniformly over the surface while being preheated by the heat leaking out. The preheated air passes through permeable or perforated refractory wall 37a into the combustible-containing gases in space 5 with which the air burns, supplying heat primarily to surface 4 of wall 1, and secondarily to the preheating of the air. The combustible gases are substantially consumed by the time they reach flue gas box 77 from which they pass through branch pipe 50 freely to steam generator 117 and through a control valve to heat exchanger 106, it being the purpose of this arrangement to furnish all the heat required in 117, by these products of combustion, utilizing the excess only in 106.

The products of combustion, containing nitrogen, carbon dioxide, water vapor, carbon monoxide and other substances, after passing out of the system at 129, are further cooled, as by washing with water for cooling, dirt removal and oxygen absorption, and are then washed with, for example, a sodium carbonate solution to remove the carbon dioxide. The residual gases comprising substantially nitrogen may be then returned to the process as crude nitrogen. If, in view of this recirculation, the burning of fuel gases with a slight oxygen excess should be objectionable, it is, of course, possible to use an excess of fuel gases to air, inasmuch as the presence of carbon monoxide in the crude nitrogen is not objectionable.

Similarly, the heated air passes through space 41b, the sub-divided boundary layer while being preheated, and the perforated or permeable refractory layer of the upper end of the converter and also cover 81 thereof into space 5 and its combustible gas containing gases, partially burning said combustible gases which arise as a product of the cyanide forming reaction and coming from space 7 through ports 29 in wall 1, the central hole in 17, and tubular passage 30 in the melting pot into said space 5. The partially consumed combustible gases pass on to the heat reservoir for the main reaction and serve as the combustible gas containing gases for that heat reservoir. No heat is generated between air box 76 and air box 75, refractory wall 37a being preferably impermeable in this section and backed up by heat insulation 53. Thus both cover 80 of pot 19 and its sides are heated and the supply of air is so controlled by the valve in 43a and the valve in 43b as to just supply the heat for producing and maintaining a film of proper temperature at the upper end of wall 1.

Air may be supplied under fan pressure through pipe 86 into space 89 inside casing 88 and its cover, being in communication with the under side of plate 118, which together with channel 119 riveted thereto and formed to fit the reinforced opening in the cover of casing 89 over the retort forms a convertor hole cover, through holes 151, the air then passing through the subdivided layer 90, previously described, into space 93, from which it passes through hole 121 in heat exchanger 106 to preheating coil 122 therein and thence to branched pipe 43 before mentioned. Any heat escaping from the convertor, or the other auxiliary apparatus in space 93, is picked up by the air, and such heat tending to escape through the subdivided boundary layer is returned with the entering air as preheat therein, conserving the available heat.

If, however, air is drawn into the apparatus by exhausting the products of combustion as later suggested, then pipe 86 may be dispensed with and a simple opening 87 in casing 88 substituted therefor, which opening is closed when pipe 86 is used.

The products of combustion pass through 117, as before mentioned, being cooled therein, and also through suitable heater elements indicated by 108 in heat exchanger 106 while being cooled therein, the divided gases uniting and passing out of casing 88 through pipe 129 at a temperature which may be of the order of 400° F. to the water cooling and wash towers specified in my process.

Particularly when starting up or when increasing the rate of operation more combustible gases may be required, hence such gases may be supplied to space 5 through a pipe 34 with control valve 125 at a point such as that shown, or at any other suitable point, preferably in the vicinity of the outlet to tube 30 in the melting pot so that ample heat may be available at the melting pot on starting. During operation at constant rate, no extra gas should be required. While decreasing the rate, it may be necessary to partially shut air valves in 43a and 43b to reduce the heat liberated in the heat reservoirs.

The raw nitrogen for the process enters through pipe 96 and passes through heater units 107 in heat exchanger 106 being preheated thereby, whereupon the preheated nitrogen at about 1200 to 1400° F. passes through pipe 21, preferably insulated, base 22, casting or fitting 128 and its passages 24 to space 7, final heating occurring by cooling of film 3 in the zone between pool 12 and flue gas box 77, purification by reduction of carbon dioxide and oxygen in the presence of excess carbon in film 3 also taking place in this zone or a portion thereof. In space 7 in the reaction zone nitrogen is given up and carbon monoxide produced to furnish combustible gases.

As finely divided carbonaceous material is required in the reaction, it may be supplied at one or more points along the length of 1, inside the reaction zone, as by pipes 83, 84 and 85 discharging finely pulverized coal or friable coke dust suspended in nitrogen, the quantity admitted through each pipe being suitably controlled elsewhere substantially as mentioned under the process, into space 7 and the gases in turbulent motion passing therethrough, whereby the pulverulent material is caused to circulate against film 3 of the melt as the gases take their helical course about 9, travelling thereby substantially crosswise of the advancing film while moving slowly countercurrent thereto, the melt film taking up the pulverulent material at a rate depending upon the turbulence, the fineness of the material, and other factors of minor importance. As shown, pipes 83, 84 and 85 pass through cover 118, its subdivided layer like 90, cover 81 of the convertor and its insulation, air passage, preheating subdivided layer, and permeable refractory, space 5, tube 30, and the interior of wall 9 to the points at which they pass through and are fastened into wall 9.

It should be noted that refractory heat insulation in convertor cover 81 similar to 53 is shown as of block-like construction supported in some manner by 81, projecting blocks such as 82 penetrating 37a and 38a somewhat as shown, thereby in turn supporting these layers of subdividing material and the permeable refractory wall.

As the temperature below flue gas box 77 and above pool 12 is high, heat insulation of refractory material 127 is indicated as a liner for heat insulation 53 which may fill the space up to casing 42 as shown.

Casing 88 is shown resting on a metal ring 94 embedded in floor 52 much as shown.

Having shown the convertor, primarily involving my invention, and also its enclosure involving inventions disclosed in my patent application Serial Number 47,355 to which previous reference has been made, and certain auxiliary devices in heat transfer relation thereto, there remains the liberating chamber 112 for carbon dioxide being liberated from a bicarbonate solution, from the combustion gases wash tower, and its heat interchanger relations to describe. Bicarbonate solution enters through pipe 109 from the wash tower, said pipe being concentric with return pipe therefor 111, the coils of double pipe arrangement serving as a heat exchanger by which the hot carbonate solution resulting from liberation of carbon dioxide from the bicarbonate is cooled while heating the bicarbonate solution nearly to the temperature of carbon dioxide liberation. Pipe 109 discharges into dioxide liberator 112 in the space above solution 110, carbon dioxide with water vapor and solution spray passing out of the apparatus through raw carbon dioxide pipe 113 which may go to a water washing tower or to storage. The partially decarbonated solution 110 is heated by steam coils 114 whereby most of the obtainable carbon dioxide is liberated and the solution kept hot, the lower layers of solution flowing into pipe 111 which eventually returns the carbonate solution to the wash tower. Steam coil 114 is fed through pipe 115, preferably heat insulated as indicated in part, from steam generator 117. The condensate returns by gravity in the case shown through pipe 116 to steam generator 117. Dioxide generator 112 is preferably heat insulated as indicated.

As it is primarily my purpose to indicate the nature of the auxiliary apparatus and suggest how such apparatus may be arranged, I have omitted valves, circulating pumps, traps, safety valves, and other equipment necessary to the operation of such apparatus which may readily be supplied by the engineer to meet my requirements.

Figure 7 shows in cross-section an element of wall 1 of Figure 6 as on line B—B. 1 is the heat-permeable wall, 2 the film surface thereof and 4 the heat reservoir surface. 6 is the gas surface of melt film 3 flowing on surface 2 of wall 1. 130 is a wire mesh or gauze catalyst supported against surface 2 and fastened thereto in any suitable manner while being permeated by melt film 3. This view indicates one way in which a fixed catalyst may be installed in suitable contact with the melt film which serves as a theater for the chemical reaction as well, perhaps, as taking part therein, while remaining in suitable heat conduction relation with wall 1 so that the heat of the chemical reaction, large or small, may be supplied or removed as the case may require. It is obvious that a primary or secondary reaction taking place in reactant-containing gases 7 of Figure 6 may similarly be cared for by a catalyst on surface 8 of wall 9, provision being made at wall surface 10 for any auxiliary heat reservoir requirements for such a reaction when not capable of proper handling solely by heat reservoir means comprising space 5 and related parts of Figures 2, 3, and 7. However, the arrangement of Figure 7 is to be preferred if at all usable in the specific reaction under consideration.

Although heat exchanger 106 has been shown supplied with heat by coils 108 and 105, and as furnishing heat to coils 107 and 122, obviously any suitable arrangement or disposition or combination of heating surface arrangements such as may best fit specific conditions may be used. The products of combustion are to be cooled from about 1800° F. to about 400° F., the purified nitrogen gases from 1000° to 1200° F. to about 200° or 300° F. while the raw nitrogen is to be heated from say 60° F. to about 1400° F. while the air supply is to be heated as much as practicable, the temperature at entrance 121 being necessarily somewhat indefinite.

The alkali-cyanide process, operating with about four times theoretical nitrogen, requires about 4.5 MM B. t. u. for heating and melting sodium carbonate, 3.5 MM B. t. u. for heating the nitrogen to about 1650° F., about 7.5 MM B. t. u. for heating the air to 1800° F., about 18 MM B. t. u. for the actual reactions, and about 5.5 MM B. t. u. for recovery of carbon dioxide from all of the products of combustion, neglecting the heating and cooling of the solution accomplished in a heat interchange manner. The total of these items is about 39 MM B. t. u. We have available by cooling the products of combustion about 10 MM B. t. u., from cooling of the salt about 3.5 MM B. t. u., and from combustion of the combustible gases formed about 26.5 MM B. t. u., cooling of the products of combustion being figured to 460° F. only. High temperature requirements total 22.5 MM B. t. u. which must be furnished almost entirely by direct combustion, leaving about 11.5 MM B. t. u. to be furnished by heat interchanger arrangements of proper sort. These heat quantities correspond approximately to the fixation of 2000 pounds of nitrogen. By wasting a part of the combustion gases we may reduce the heat required for carbon dioxide recovery and thereby secure a positive excess of heat over all requirements and unavoidable losses. My methods of heat insulation together with my methods of constructing heat reservoirs permit me to support the necessary reactions with the heat from cooling, and heat obtained from burning the combustible products of the reaction, whereas heretofore the combustible products have sufficed for but a small part of the heat requirements of the process. If ammonia instead of hydrocyanic acid gas is recovered by suitable process and apparatus modifications, the heat excess obtainable is materially greater.

*Gas flow.*—Any desired type of flow, turbulent or laminar, may be used, as required in the process and permitted by the apparatus. In particular, annular or cylindrical passages over the melt film may be used, including the tube formed by the melt film itself, and helical or other gas passages may be used for directing the gas more effectively into contact with the melt film for increasing the rate of reaction. Tapered zones may be used when film thicknesses may vary, permitting control of clearance 13 by axial motion of a member similar to 9 but formed in tapered shape. Turbulent flow is particularly important when a pulverized solid is carried suspended in the gas-like body, which pulverized material must be caused to enter the melt film. Turbulence then acts to throw the particles into the laminar flow layer of gas and even through this layer with ease, materially facilitating the transfer of such material from the gas to the melt. The flow of the gases in a helical path sets up some centripetal effects which aid this evacuation of the solid from the gas. Of course much depends on the degree of turbulence and the fineness, shape, and density of the particles. It will usually be desirable to have the precipitation of the particles in the melt take several complete turns along the helical path so as to secure fairly uniform spreading of the particles over the film surface. Several points of admission may be necessary, particularly when it is undesirable to have the melt film carry a burden sufficient for the reaction along the whole tube, and also when the particles precipitate too rapidly from the gas stream so that the film burden becomes too greatly lacking in uniformity.

However, much can be done by securing a proper mean size of particle by trial together with a suitable gradation in the sizes of particles present. Particles which are too fine, however, lead to undue waste of material. On the other hand, as in the alkali-cyanide apparatus I have described, it may be desirable to have some material of this sort present to augment the "combustible gases" which pass on to the "heat reservoir."

*Heat reservoir.*—Furnace variations are discussed in my copending patent application Serial No. 47,355 on Furnaces. Division of fluid supply into several separately controlled zones is one method; control of permeability axially of the retort in 38 is also possible. A wide range of constructions is possible to secure particular results.

*Film feeder.*—Any film feeder is suitable which secures uniform feed circumferentially of the annulus at all ordinary variations in rate of operation. Two examples, the horizontal lip type, and the annular orifice under fluid pressure type are shown as examples. In the rotary retort, a sufficiently high uniform rate of rotation and constant rate of fluid supply through the spreader pipe are required.

*High pressure.*—My application Serial No. 7,582 may be consulted for suggestions on adapting the present apparatus to any pressure and temperature conditions. In general, the cold walls carry the pressure, while hot surfaces are arranged to take substantially balanced pressures, the fluids transmitting the load from hot to cold sections. Introducing and removing liquids, solids and gases under pressure are quite orthodox.

*Alkali-cyanide process modifications.*—The process and apparatus permit of wide variations in material, such as nitrogen, carbon dioxide, type of carbonaceous material, methods of purification of cyanide, and the like, without departing from my invention. In particular, if ammonia is to be recovered from the alkali cyanide by hydrolysis thereof, an alternative procedure to conversion of the cyanide to HCN, the hot granular salt at about 170° C. may be charged into an autoclave or pressure retort and subjected to the action of saturated steam, preferably from the steam generator 117. The alkali residue after the hydrolysis, containing carbonate, formate and oxalate, may be returned to the process as raw material where the melting heat will convert formate and oxalate to carbonate. The alkali cyanide produced in my process is so free from iron that almost complete ammonia conversion can be obtained.

I believe that these specifications cover the inventions which I have made in sufficient detail to enable one skilled in the art to utilize them and to make such modifications as may be required in particular cases to adapt my invention to the particular process.

Although I am aware that molten substances have been caused to react with gases in the presence of heating arrangements of various sorts, I am not aware that the particular process of so doing which I have invented and the particular forms of apparatus which I have invented, of a broad character, have heretofore been devised or used, so I claim with such breadth as appears permissible in view of the state of the art.

This is a continuation in part of my copending application Serial No. 717,701, filed March 28, 1934.

What I claim and desire to protect by Letters Patent is:

1. In the process for the fixation of nitrogen as alkali-cyanide, the steps comprising, producing an alkali-containing melt-body of low melting point, flowing the melt-body at a controlled rate in a uniformly thin film by a direct path through first the stage of heating the film to between 900 and 1050 degrees centigrade, second through the reaction stage in contact with an agent catalytic to the reaction while maintaining the film temperature between 900 and 1050 degrees centigrade, third through the stage of purifying the nitrogen-containing gas by reduction, then recovering the melt-product, meantime introducing nitrogen-containing gases aforesaid in the third stage, sweeping the melt-body film through three stages with the gaslike body in a stream of hydraulic radius small compared with the path of flow thereof and in turbulent flow, introducing pulverulent carbon adapted to the reaction into the gaslike body during the second stage, removing the gaslike product near the melt-body entrance to the first stage, and burning the contained combustible of the gaslike product with combustion-supporting gases while supplying heat required in the process.

2. The process of producing hydrocyanic-acid gas comprising, process claim 1, the cooling of the melt-product in neutral gases, the crushing of the melt product, the spreading of the melt-product in a thin layer, the moistening of the melt-product with a small proportion only of the water required in the reaction, the rapid flowing through said layer of $H_2O$-containing carbondioxide gas in excess, and the recovery of the hydrocyanic-acid from the resulting gases.

3. In an apparatus for effecting chemical reactions between melt-bodies and gaslike bodies, the parts comprising, a hollow vertical cylinder, a surface layer at the inner surface thereof adapted to being wet by the melt-body, means for feeding a uniformly thin melt-film onto the upper portion of the inner surface layer of the hollow cylinder, means for removing the melt-product from a lower portion thereof, means for guiding a gaslike body over the melt-film surface in a stream of hydraulic radius small compared with the path of flow of said gaslike body, means for feeding a gaslike body into contact with the melt-film surface, means for removing the gaslike product from such contact, a heat-resisting permeable barrier spaced from the hollow cylinder and on the outer side thereof, means for supplying fuel between the permeable barrier and the hollow cylinder, means for passing combustion-supporting gas inwardly through the permeable barrier at a rate varying from point to point for the control of the rate of combustion at each point.

4. In a process for the fixation of nitrogen as ammonia, the steps comprising, producing a low-melting-point, alkali-containing melt-body, feeding the melt-body to an annular surface to form an annular film, sweeping a surface of the melt film with a gaslike body containing both hydrocarbon and nitrogen gas under an ammonia producing pressure, the thickness of the melt-film on any plane at right angles to the direction of flow thereof and the velocity of flow of the melt-film across any said plane being uniform and constant, the thickness of the gaslike body being substantially uniform on any said plane, and the rate of flow of the melt-film and of the gaslike body being independently controlled, and effecting a controlled transfer of heat with respect to the melt-film by means of a fluid medium flowed in heat interchange relation with the melt-film.

5. In a process for the fixation of nitrogen as ammonia, the steps comprising, producing a low-melting-point, alkali-containing melt-body, feeding the melt-body to an annular surface to form an annular film, sweeping a surface of the melt-film with a gaslike body containing both hydrocarbon and nitrogen gas under an ammonia producing pressure, the thickness of the melt-film on any plane at right angles to the direction of flow thereof and the velocity of flow of the melt-film across any said plane being uniform and constant, the thickness of the gaslike body being substantially uniform on any said plane, and the rate of flow of the melt-film and of the gaslike body being independently controlled, and effecting a controlled transfer of heat with respect to the melt-film by means of a fluid medium flowed in heat interchange relation with the melt-film, the temperature and flow of the fluid medium being independently varied throughout the course-wise extent of the annular melt-film so as to maintain a uniform temperature in said melt-film on any said plane.

6. In a continuous process for the fixation of a nitrogen by an alkali-cyanide reaction, the steps comprising producing a low-melting-point alkali-containing melt-body, flowing the melt-body at a controlled rate in a uniformly thin film while in contact with a catalyst, imposing a set of ammonia producing temperatures higher than the melting point of the melt-body upon a plurality of melt-film points placed coursewise of said melt-film, sweeping a surface of said melt-film with a gaslike body containing both hydrocarbon and nitrogen gas under an ammonia producing pressure, recovering the ammonia and carbon-containing melt-product, transferring the carbon-containing melt-product to an alkali-cyanide process for the fixation of nitrogen wherein the melt-film containing finely divided carbon is utilized and converting the crude cyanide formed into a nitrogen compound and an alkali-containing residue.

7. A process for the fixation of nitrogen as alkali cyanide which comprises forming an alkali-containing melt-body of low melting point, flowing the melt-body at a uniform rate in a uniformly thin film in contact with an agent catalytic to the reaction and at a temperature adapted to promote the reaction, incorporating pulverulent carbon in the melt-body, sweeping the melt-body film with nitrogen-containing gases in a counter-flowing stream of hydraulic radius small compared with the path of flow thereof, removing the gases formed during the reaction, burning the combustible constituents thereof to furnish heat required in the process, and supplying combustion-supporting gases to the burning gases in a plurality of independently controllable streams so as to independently control the heat furnished at different stages in the process.

8. Apparatus for effecting chemical reactions between melt-bodies and gaslike bodies comprising a hollow annular shell inclined at an angle to the horizontal, means for feeding a film of the melt-body onto one surface of the shell adjacent the upper end thereof and spreading said film uniformly circumferentially of the shell, means for feeding a gaslike body into contact with the melt-film surface and guiding it over the surface, means for removing the melt product located adjacent the lower end of the shell, a porous barrier spaced from that surface of the shell not covered by the melt film, means for supplying a fluid to the space between said porous barrier and the shell wall and means for supplying a fluid to the outer face of said barrier whence it may flow into said space.

9. Apparatus for effecting chemical reactions between the melt-bodies and gaslike bodies comprising a hollow annular shell inclined at an angle to the horizontal, means for feeding a film of the melt-body onto one surface of the shell adjacent the upper end thereof and spreading said film uniformly circumferentially of the shell, means for feeding a gaslike body into contact with the melt-film surface and guiding it over the surface, means for removing the melt product located adjacent the lower end of the shell, a porous barrier spaced from that surface of the shell not covered by the melt film, means for supplying a fluid to the space between said porous barrier and the shell wall and means for supplying a second fluid to the outer face of said barrier whence it may flow into said space, and means for varying the flow of second fluid to each of a plurality of zones into which the space between the porous barrier and the shell wall is axially divided.

10. Apparatus for effecting chemical reactions between melt-bodies and gaslike bodies comprising a hollow vertical annular shell, means for feeding a film of the melt-body onto one surface of the shell adjacent the upper end thereof and spreading said film uniformly circumferentially of the shell, means for feeding a gaslike body into contact with the melt-film surface and guiding it over the surface, means for removing the melt product located adjacent the lower end of the shell, a porous barrier spaced from that surface of the cylinder not covered by the melt film, means for supplying a fluid to the space between said porous barrier and the shell wall and means for supplying a fluid to the outer face of said barrier whence it may flow into said space.

11. A process for the fixation of nitrogen as alkali cyanide which comprises forming an alkali-containing melt body of low melting point, feeding a film of the melt body onto a surface of a hollow, rotatable, inclined cylindrical shell adjacent the upper end thereof, incorporating pulverulent carbon in the melt body film, rotating the cylindrical shell to spread said film uniformly circumferentially of the cylinder, feeding nitrogen-containing gases into contact with the melt film surface and guiding them over the surface, and removing the alkali cyanide melt product adjacent the lower end of the cylinder.

EDWARD ADAMS RICHARDSON.